(12) United States Patent
Wipperfurth et al.

(10) Patent No.: US 6,373,220 B1
(45) Date of Patent: Apr. 16, 2002

(54) DEVICE FOR FORMING A PLURALITY OF ACCUMULATORS THAT ARE COMBINED TO FROM A GROUP

(75) Inventors: Walter Wipperfurth, Taunusstein-Hambach; Markus Rompel, Limburg-Lindenholzhausen; Thomas Ohl, Hunstetten-Wallrabenstein; Frank Rompel, Limburg a. d. Lahn; Horst Lampert, Taunusstein-Hambach; Eduard Wala, Idstein-Worsdorf, all of (DE)

(73) Assignee: CMW Automation GmbH, Runkel-Ennerich (DE)

( * ) Notice: Subject to any disclaimer, the term of this patent is extended or adjusted under 35 U.S.C. 154(b) by 0 days.

(21) Appl. No.: 09/744,979
(22) PCT Filed: Aug. 9, 1999
(86) PCT No.: PCT/EP99/05764
 § 371 Date: Feb. 16, 2001
 § 102(e) Date: Feb. 16, 2001
(87) PCT Pub. No.: WO00/11729
 PCT Pub. Date: Mar. 2, 2000

(30) Foreign Application Priority Data

Aug. 18, 1998 (DE) .......................... 198 37 449

(51) Int. Cl.[7] ............................................. H01M 10/46
(52) U.S. Cl. ....................................................... 320/107
(58) Field of Search ................................ 320/107, 112, 320/116, 117, 166, 167; 361/299.2, 299.3, 306.1, 328, 600

(56) References Cited

U.S. PATENT DOCUMENTS 4,290,444 A   9/1981   Bevan

FOREIGN PATENT DOCUMENTS

| DE | 2618748 | 11/1977 |
|----|---------|---------|
| DE | 3744606 | 7/1989  |
| EP | 406464 A1 | 1/1991 |
| GB | 153687  | 11/1920 |

Primary Examiner—Edward H. Tso
(74) Attorney, Agent, or Firm—Charles P. Boukus, Jr.

(57) ABSTRACT

Disclosed is a device (10) for forming a plurality of accumulators (14) that are combined to form a group (12) and positioned on a supporting element (60). The poles (16) of the accumulators (14) are arranged on the upper wall (20) of a housing. The device comprises a flat component (22) in the form of a plate, frame, grid or the like. A plurality of pole contacts (24,26) corresponding to the poles (16) of the accumulators (14) are arranged on said component. The pole contacts (24,26) are joined to a central electrical supply connection (32) by means of electro-conductive elements (28,30) that are fastened to the component (22).

18 Claims, 12 Drawing Sheets

DEVICE FOR FORMING A PLURALITY OF ACCUMULATORS THAT ARE COMBINED TO FROM A GROUP

SPECIFICATION

Figure 1:
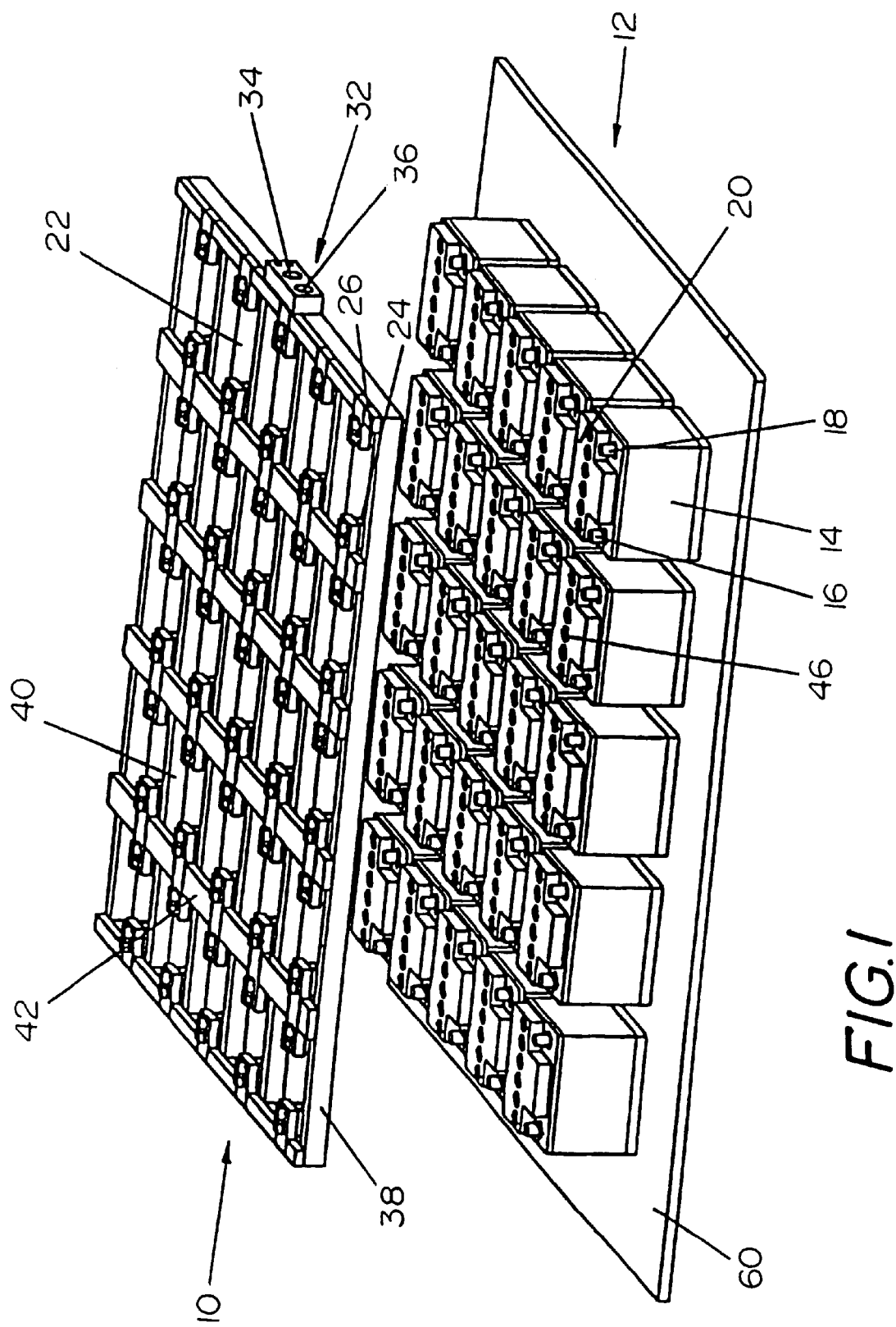

The invention relates to a device for forming a plurality of accumulators, combined into a group and positioned on a supporting element, in particular accumulators for motor vehicles, whose poles are preferably disposed on an upper housing wall.

After such accumulators or batteries are manufactured, they are filled with acid for the first time through the filler openings and then charged for the first time. This process of charging accumulators combined into a group is also called forming.

Until now, after being filled with acid, these accumulators have been put together in groups of 15 to 25 each, and the poles of the individual batteries have been connected manually to the charging device via single, individual pole cables. The filler openings of the batteries are also equipped with so-called degassing elements, which trap liquids but allow gas to escape. A disadvantage of this, however, is that preparing the accumulators for the forming entails a considerable expenditure of time and manual labor.

A device for forming that has the characteristics recited at the outset is already known from German Patent Disclosure DE 37 44 606 A1. This device includes a charging and discharging unit electrically connected to the accumulators, along with means for filling them with electrolyte, a separator for electrolyte and gases that communicates with the accumulators, means for generating the evacuation periodicity, and an evacuation unit, all of these communicating with one another in succession. An electrolyte distributor means, which is mechanically connected to a rotary element, communicating hydraulically with the separator for electrolyte and gases and with each accumulator. The accumulators are connected electrically to one another and are arranged on a support frame of an electrolyte distributor means. A charging and discharging unit is connected to the first and last of the successively connected accumulators.

A portable charging stand for holding a plurality of electronic calculators is known from German Published, Nonexamined Patent Application DE-OS 26 18 748. The charging stand takes the form of a flat tub open at the top, in the interior of which, through inward-pointing projections that face one another in pairs along their long sides, a number of compartments, each for holding one of the calculators, is embodied, corresponding in number to the number of calculators to be received. The receptacle in each case is dimensioned such that the associated calculator, after being introduced into the applicable compartment, is securely held in the interior of the tub by connection of its plug connector to the charging terminal provided in this compartment, but protrudes freely accessibly past the upper edge of the tub.

By comparison, the object of the invention is to refine a device of the type defined at the outset in such a way that preparing the accumulators for the forming is simplified considerably.

In the device having the characteristics recited at the outset, this object is essentially attained by a flat component, embodied as a plate, frame, grid, or strip, on which a plurality of pole contacts corresponding with the poles of the accumulators are arranged, wherein the pole contacts are connected to a central electrical supply connection of the component via electrical conductor elements that are fastened to the component, and for forming the accumulators, the component can be placed or mounted along with the pole contacts, the poles of the group of accumulators, in order to establish a conductive connection between pole contacts and poles.

Because of this provision, the preparation for forming the accumulators is simplified considerably, since the component, by simply being placed on the group of accumulators, enables the making of an electrical connection between the charging device and all the accumulators in a single operation.

Advantageously, the component comprises a frame with transverse struts and/or longitudinal struts disposed on it. This creates the prerequisite so that the pole contacts can be fastened to the component in a form adapted to the structural size of the accumulators and to the positioning of the poles of the accumulators.

In particular, the pole contacts are positioned in rows and columns on the order of a matrix on the component. In this respect, it has proved advantageous that the spacing of the rows and/or columns have values such that the pole contacts can be put into electrical contact with the poles of accumulator groups of different structural size, optionally with modification of the grouping of the accumulators. This offers the possibility of forming groups of accumulators of different structural size using one and the same component.

Especially advantageously, the component has one or more degassing elements, fastened in particular to the transverse struts or longitudinal struts, and in particular a woven fabric structure or a semipermeable membrane or the like, which are associated with the filler openings of the accumulators. Thus the degassing elements, upon placement of the component on the group of accumulators, thus putting the pole contacts into electrical contact with the poles, automatically come to be placed over the filler openings of the accumulators, so that there is no longer any need to equip the accumulators with degassing elements individually.

In another advantageous feature of the invention, the component has a degassing labyrinth for returning the condensate.

It has also proved advantageous that sensors, such as temperature sensors or the like, for monitoring the charging process of the accumulators are disposed on or in the component.

Advantageously, the pole contact is fastened substantially vertically displaceably on the component, so that slight variations in height in terms of the positioning of the poles of the accumulators are automatically compensated for, and provision is made for a secure electrical connection between the pole contacts and the poles of the accumulators.

In this respect it is appropriate to subject the pole contact to the prestressing of a spring; the spring prestressing seeks to displace the pole contact toward the pole, in order to provide for a secure seat of the pole contact on the pole.

In a further, especially advantageous and independent feature of the invention, which is also employed independently of the component for every other pole contact, the pole contact is embodied as a pair of contact pincers that has two or more pincer elements, as a result of which an electrically good contact is provided for between the pole contact and the corresponding pole.

Especially advantageously, the pincer elements are guided on the component or other structural part by means of an oblique guide.

The oblique guide has an opening chamfer and/or a closing chamfer, so that the pair of contact pincers is shifted to the opening or closing position by compulsory guidance as a function of the positioning, in particular the vertical positioning, of the component or some other element.

The manipulation of the device is especially advantageous in combination with a supporting element, such as a pallet, built-up pallet or conveyor belt or the like, on which the group of accumulators can be positioned.

The supporting element advantageously has positioning aids for the group of accumulators, and the positioning aids optionally vary depending on the structural size of the accumulators.

Especially advantageously, the component is pivotably connected to the supporting element, for instance via a hinge. After the positioning of the group of accumulators on the supporting element, the individual positioning depending for instance on the structural size of the accumulators, the component, to prepare for the forming, is simply pivoted onto the group of accumulators; the pole contacts automatically place themselves on the poles of the accumulators, and at the same time the degassing elements close the filler openings of the accumulators to prevent the escape of liquids.

Because the component placed on the group of accumulators can be connected to the supporting element via retaining elements, locking elements or the like, the group of accumulators to be formed is mechanically held together and can be transported as a package without further provisions being made. Overall, this provision creates a solid, independently manipulatable package, comprising the supporting element, the group of accumulators, and the component.

It has also proved to be favorable that the supporting element has vertical frame parts for stacking a plurality of supporting elements, and the component is preferably pivotably connected to the frame part or locked to it, braced on it, or in some similar way separably fastened to it. Because of this provision, a plurality of such packages, comprising a supporting element, a group of accumulators, and a component, can for instance be stacked one above the other in a space-saving way for the forming.

Further objects, characteristics, advantage and possible uses of the present invention will become apparent from the ensuing description of the exemplary embodiments. All the characteristics described and/or shown in the drawing, either alone or in arbitrary appropriate combination, form the subject of the present invention, regardless of either their combination in the claims or the claims dependency.

Figure 2:
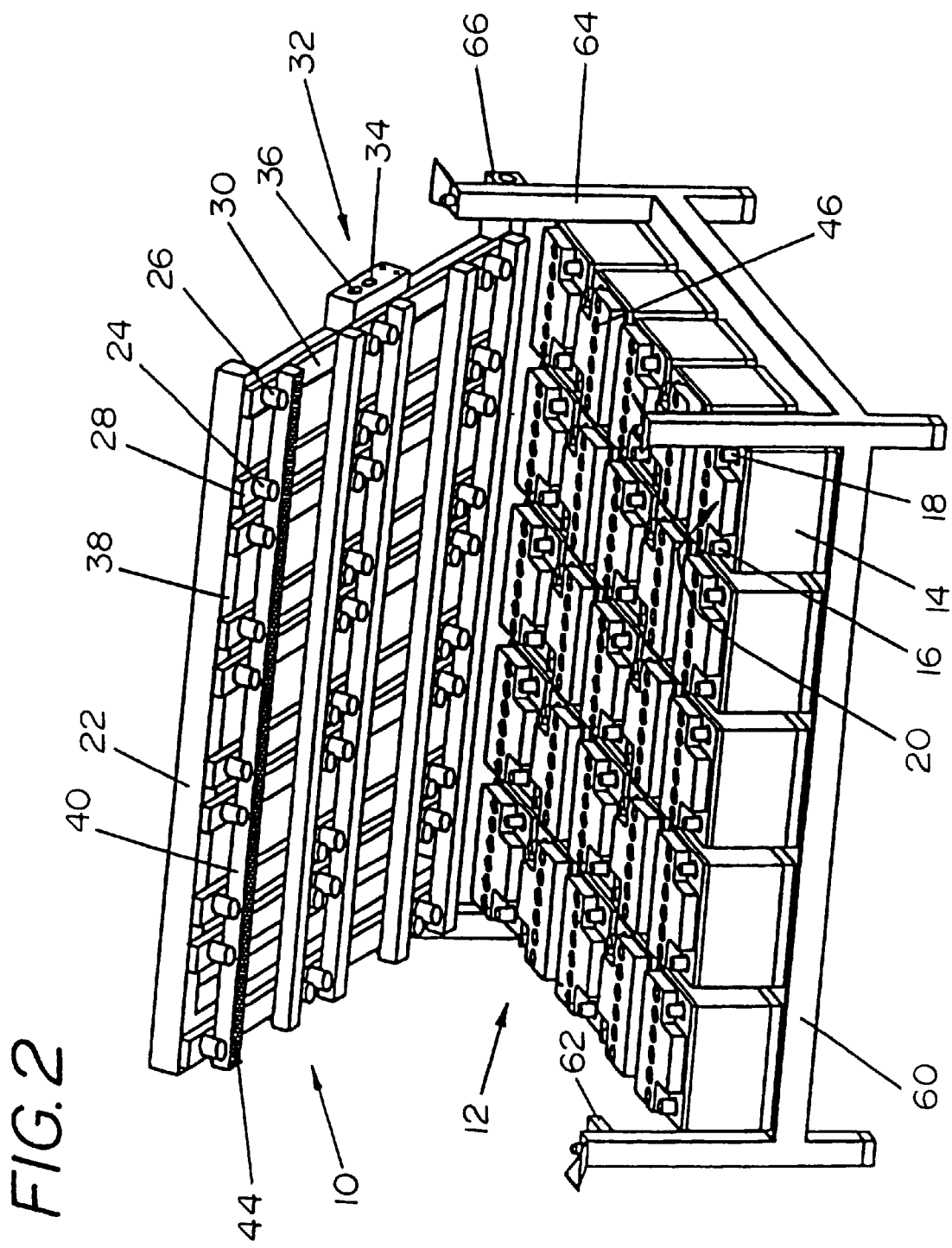
Figure 3:
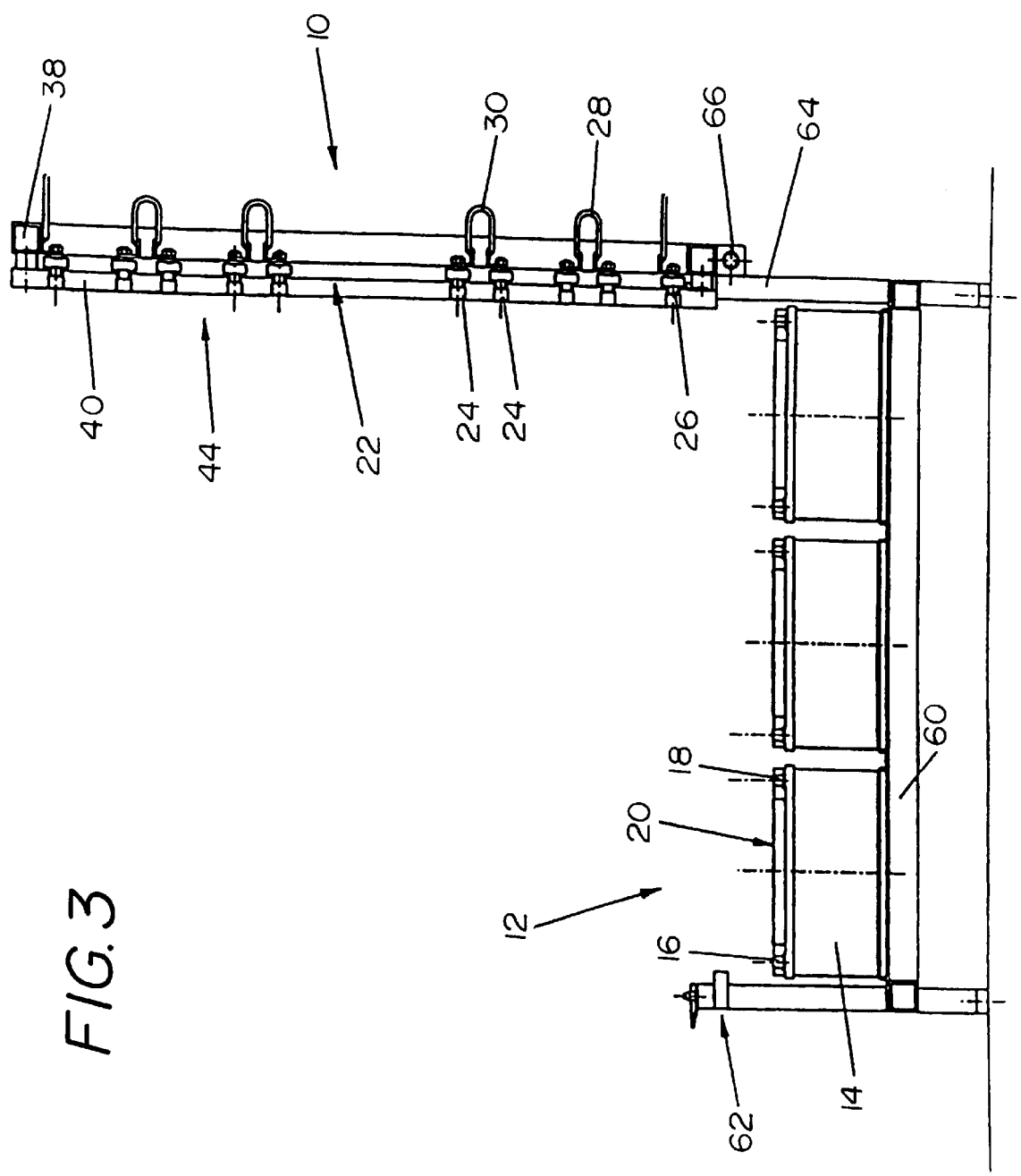
Figure 4:
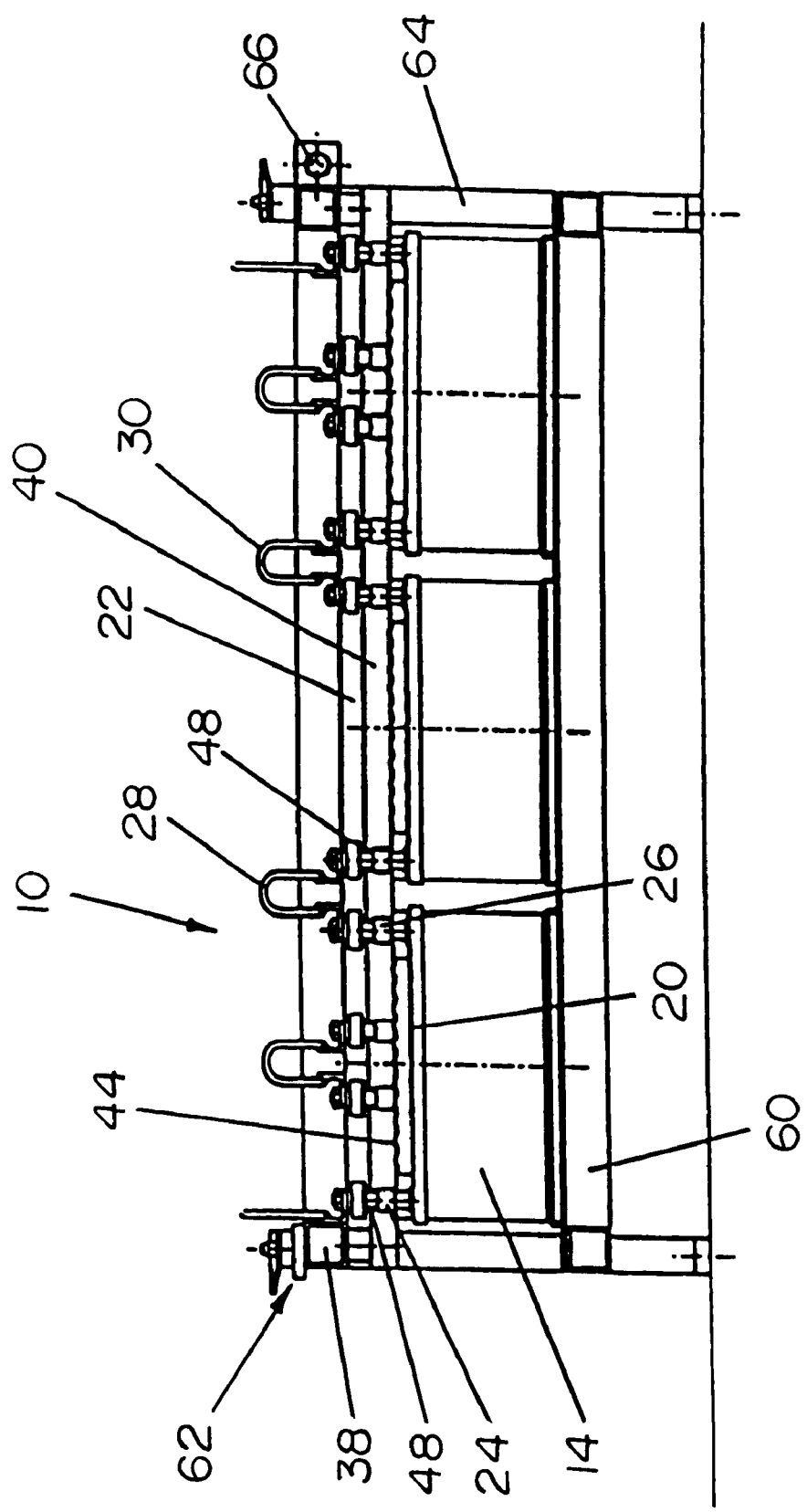
Figure 5:
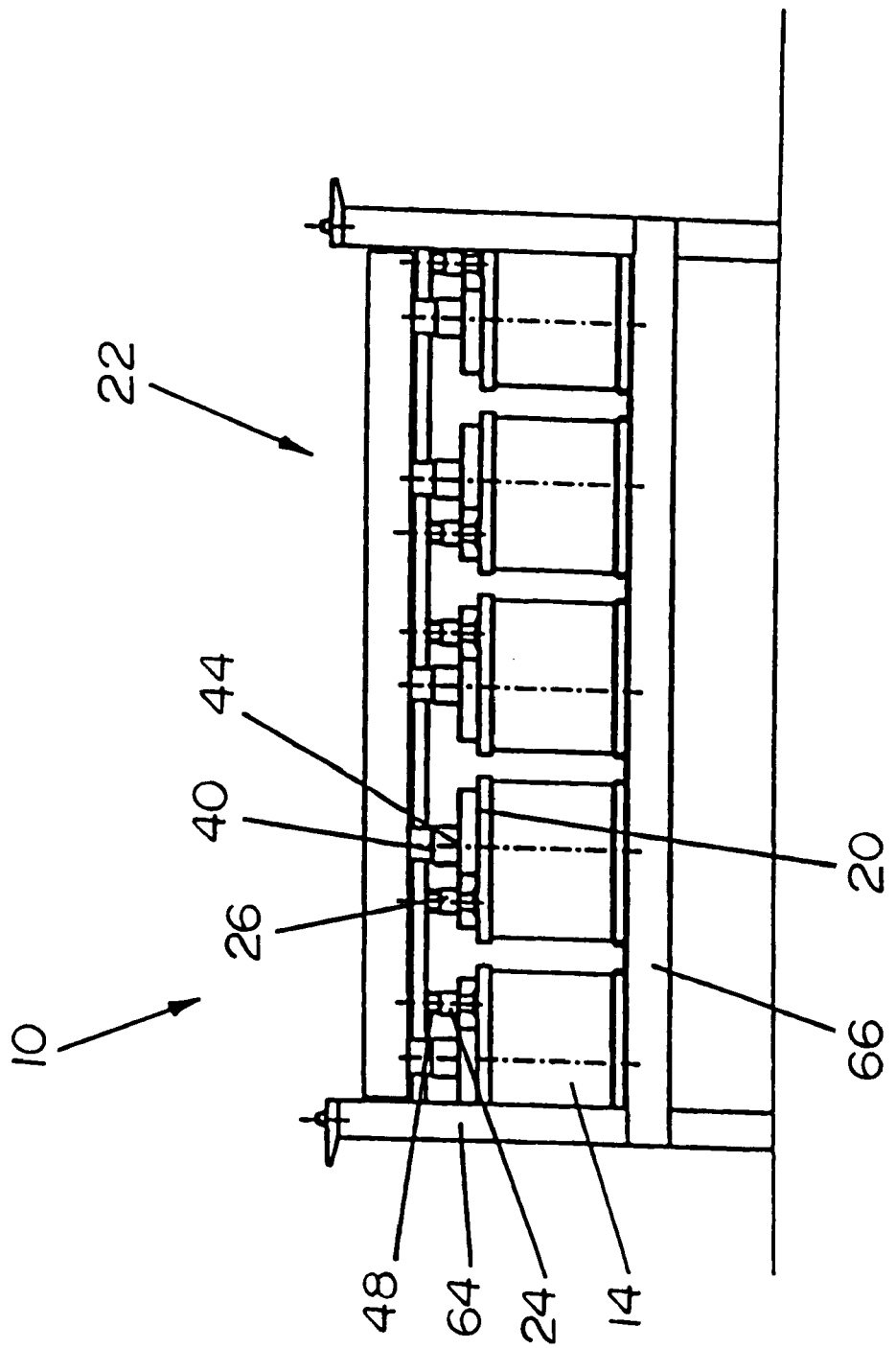
Figure 6:
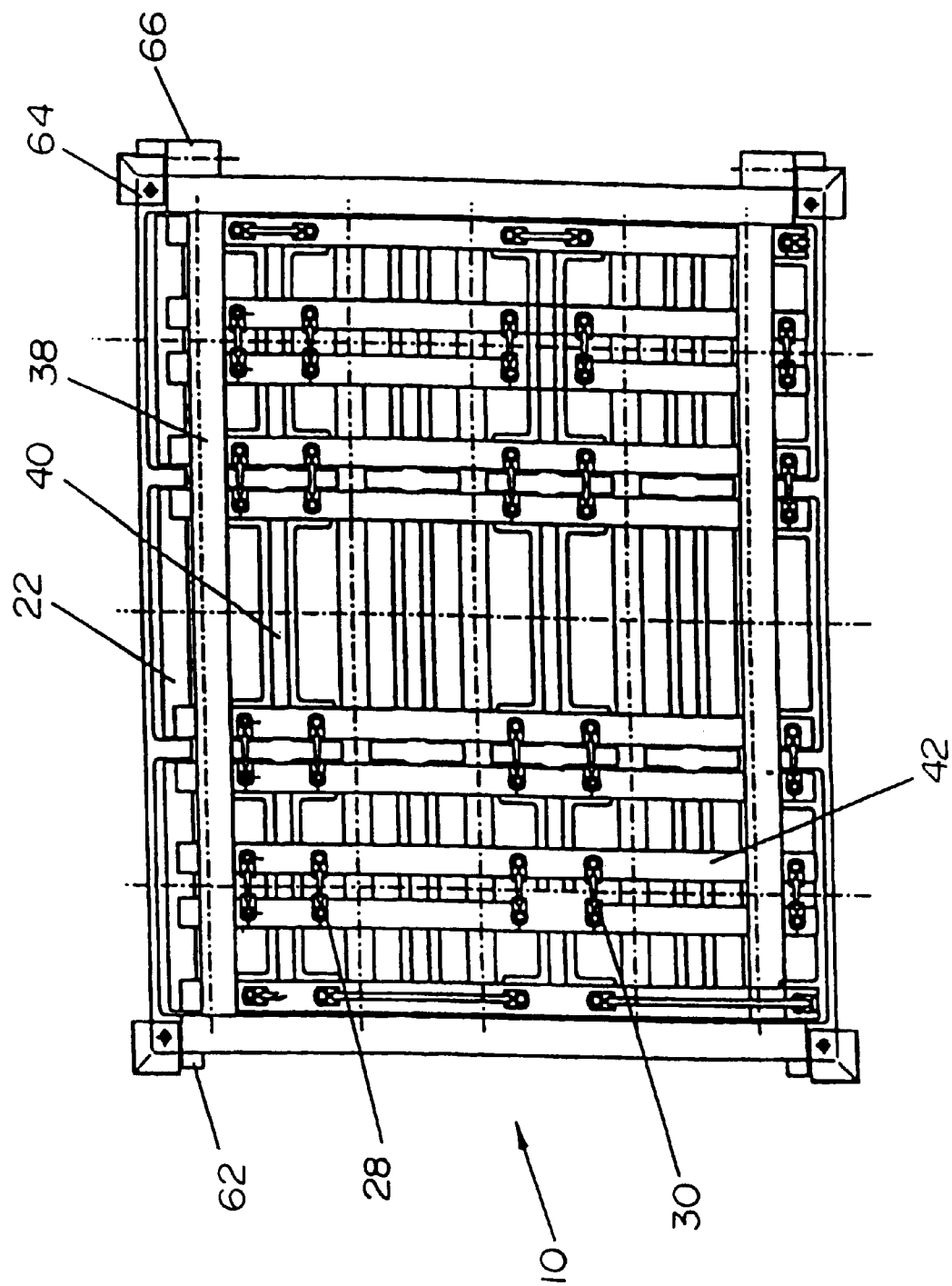
Figure 7:
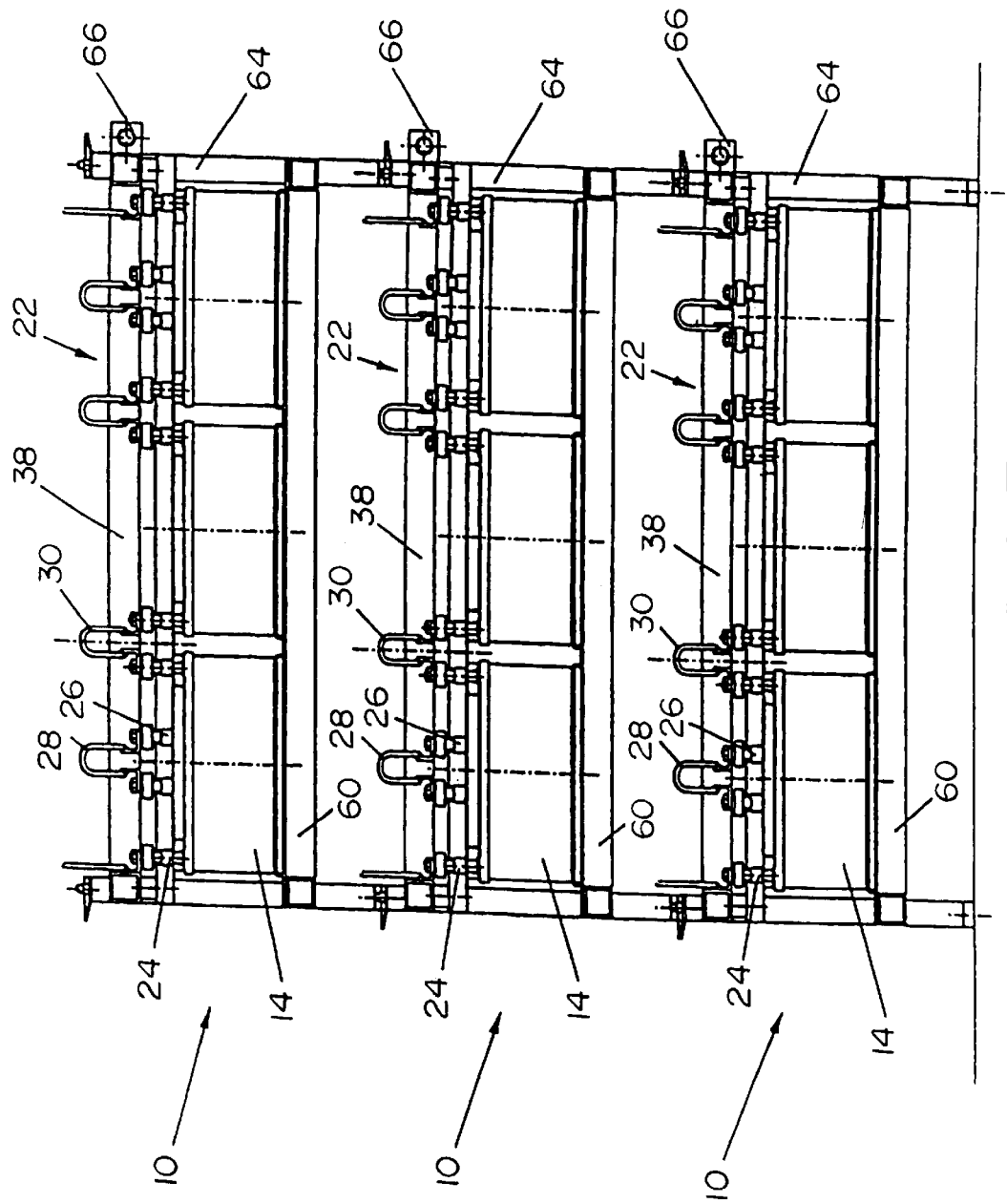
Figure 8:
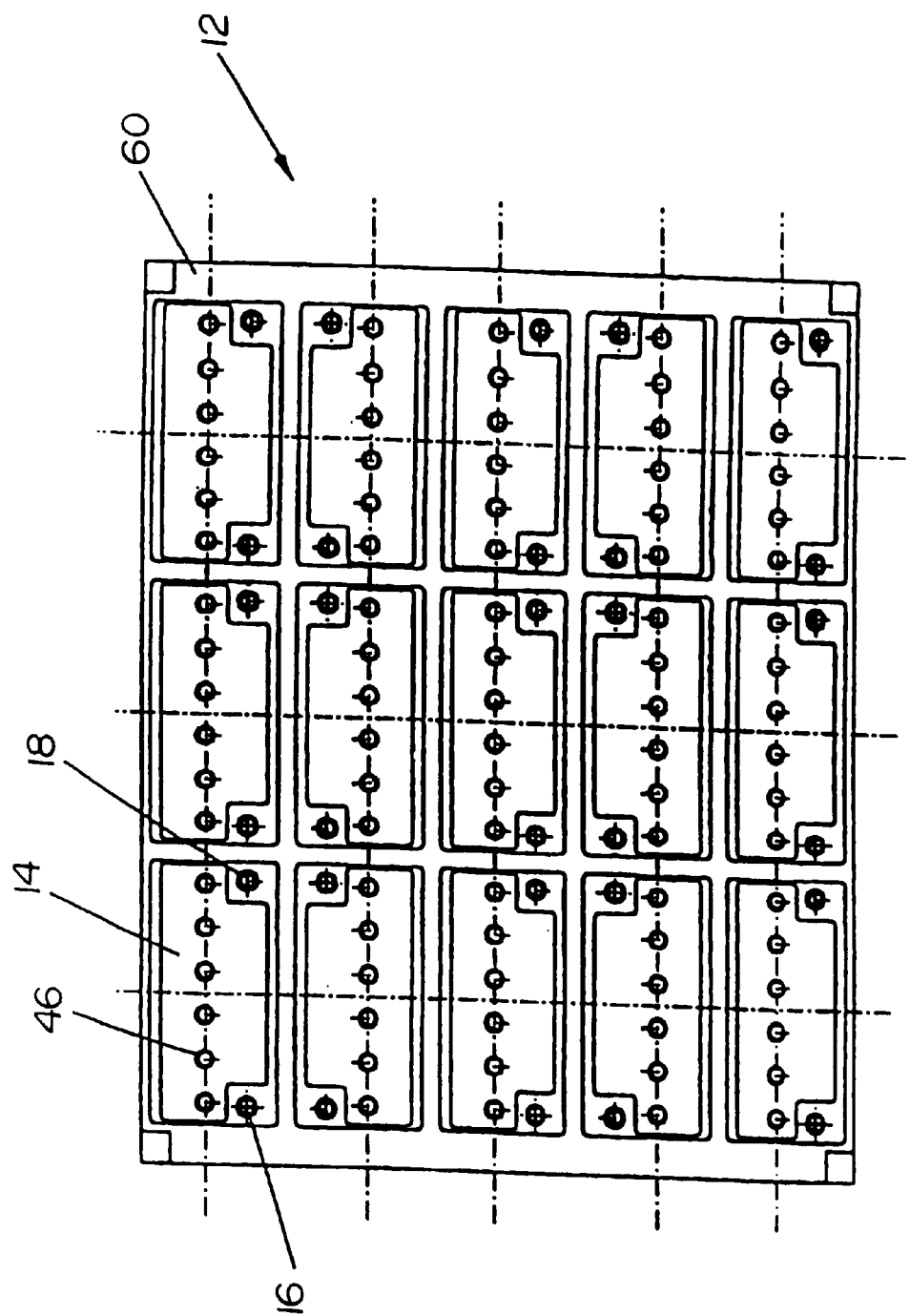
Figure 9:
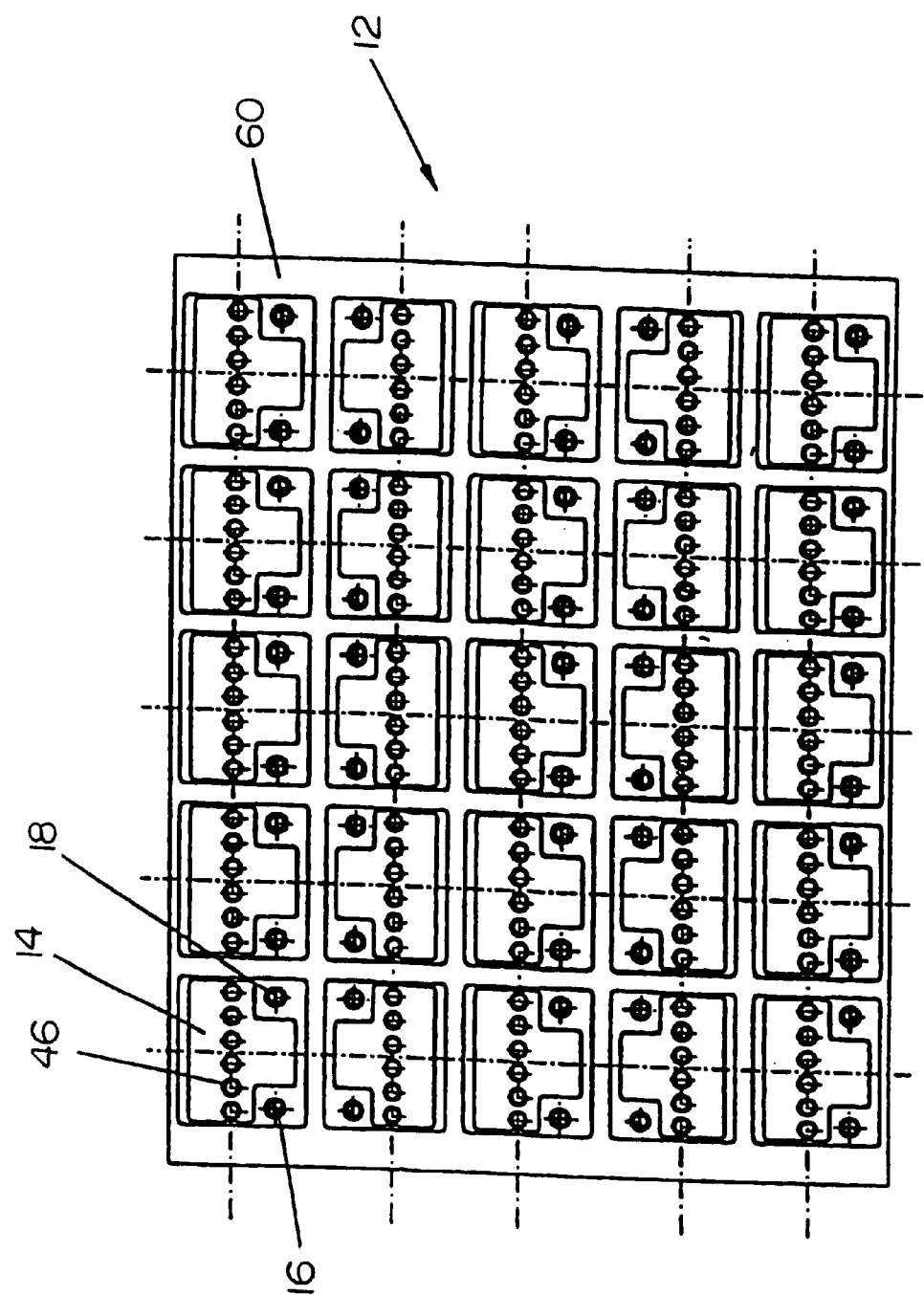
Figure 10:
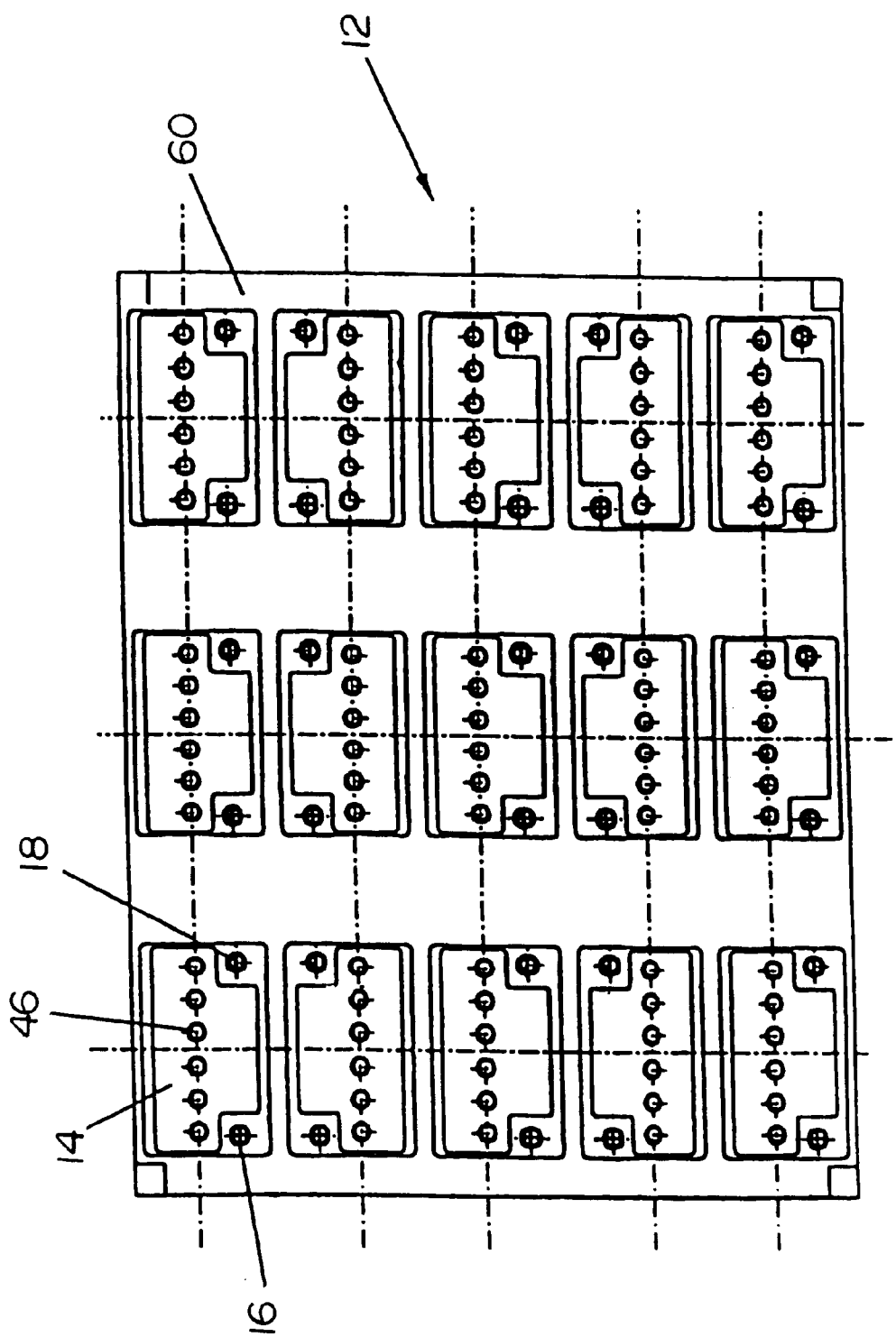
Figure 11:
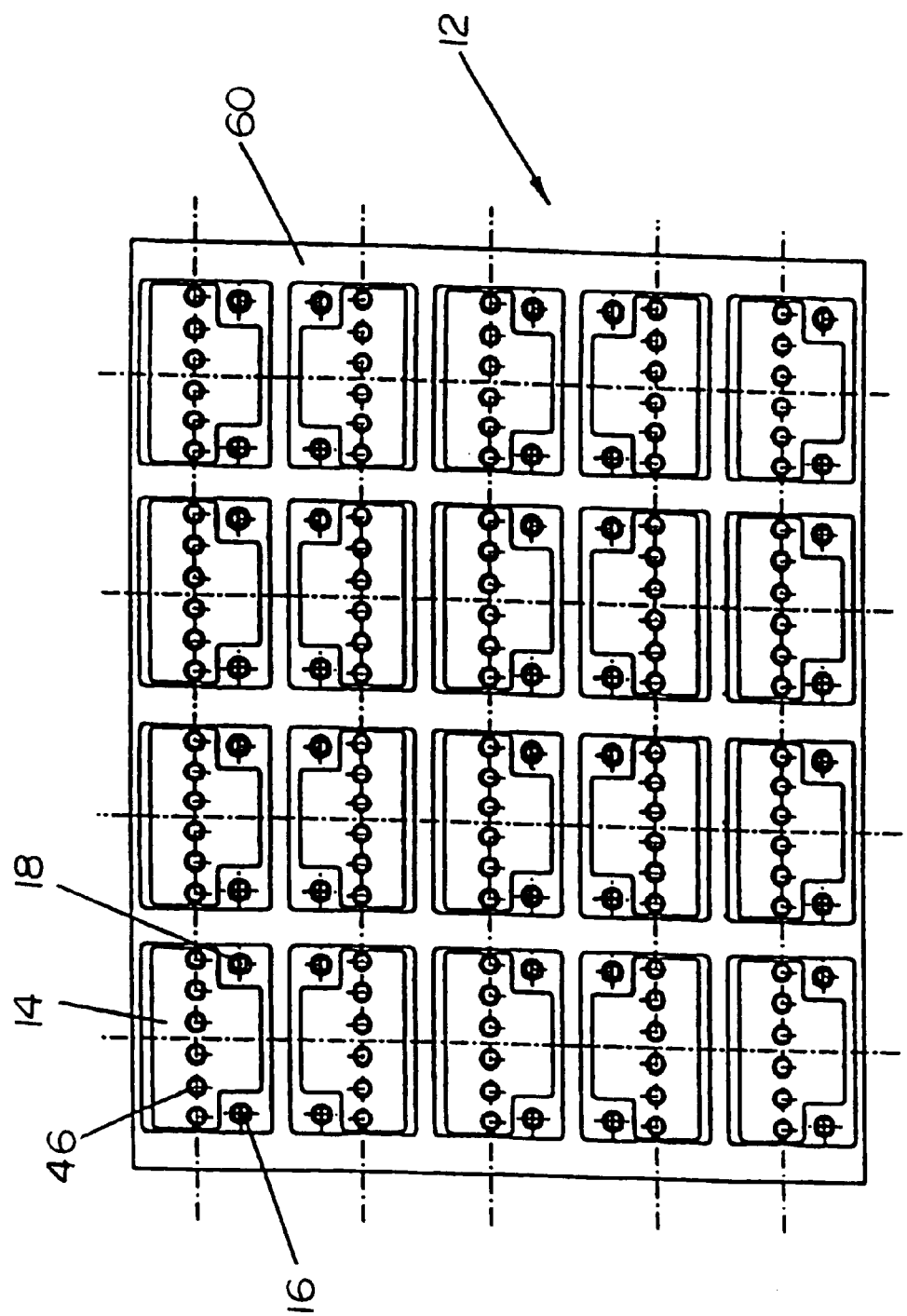
Figure 12A:
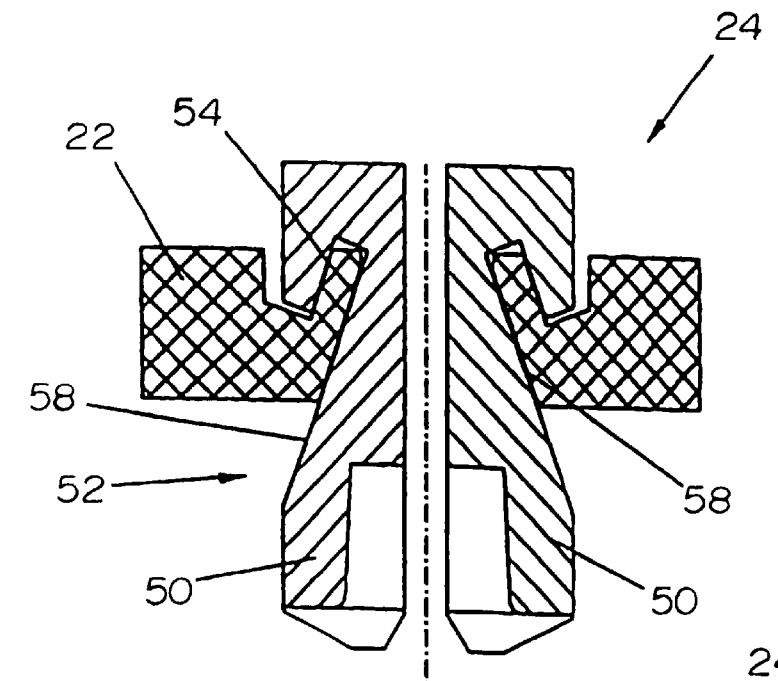
Figure 12B:
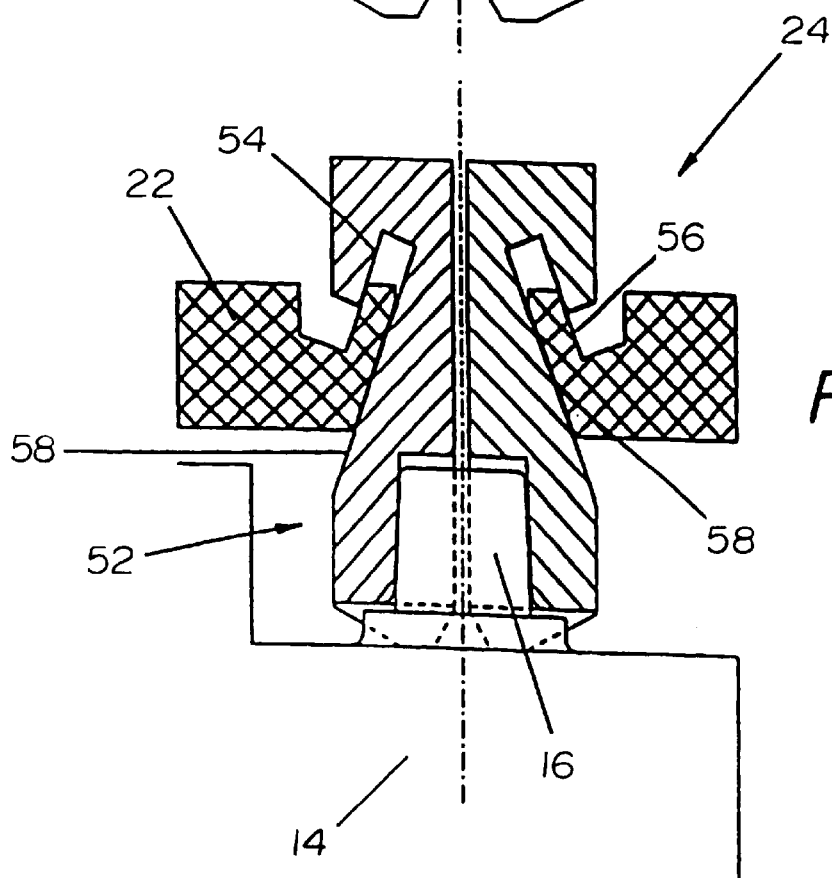

Shown are:

FIG. 1, a first exemplary embodiment of the device according to the invention, in a perspective, schematic illustration;

FIG. 2, a second exemplary embodiment of the device according to the invention, in a perspective, schematic illustration;

FIG. 3, a third exemplary embodiment of the device of the invention in a side view, partly cut in section, with the component pivoted upward from the supporting element;

FIG. 4, the exemplary embodiment of FIG. 3, with the component pivoted onto the group of accumulators, in a side view;

FIG. 5, the device of FIG. 3 in a front view;

FIG. 6, the device of FIG. 3 in plan view;

FIG. 7, a plurality of devices of FIG. 3, stacked one above the other;

FIG. 8, the grouping of accumulators on the supporting element, in which the accumulators have a housing length of 350 mm;

FIG. 9, the grouping of accumulators on the supporting element, in which the accumulators have a housing length of 200 mm;

FIG. 10, the grouping of accumulators on the supporting element, in which the accumulators have a housing length of 275 mm;

FIG. 11, the grouping of accumulators on the supporting element, in which the accumulators have a housing length of 240 mm; and FIGS. 12A & 12B, details of the embodiment of the pole contacts as a pair of contact pincers, in a sectional view.

The device 10, shown in the drawings, for forming a plurality of accumulators 14, in particular accumulators for motor vehicles, that are combined into a group 12 and positioned essentially in one plane, whose poles 16, 18 are preferably arranged on an upper housing wall 20, has a flat component 22 embodied as a plate, frame, grid, strip or the like. A plurality of pole contacts 24, 26, corresponding to the poles 16 of the accumulators 14, are arranged on the component 22. The pole contacts 24, 26 are connected to a central electrical supply connection 32, which in particular has a positive terminal 34 and a negative terminal 36, via electrical conductor elements 28, 30 fastened to the component 22.

The component 22 comprises a frame 38 with transverse struts 40 and/or longitudinal struts 42 disposed on it. The pole contacts 24, 26 are positioned in rows and columns on the order of a matrix on the component 22. The spacing of the rows and/or columns have values such that the pole contacts 24, 26 can be put into electrical contact with the poles 16, 18 of accumulator groups of different structural size, optionally with modification of the grouping of the accumulators 14. In FIGS. 8–11, various groupings of accumulators 14 of different structural size are shown, all of which are formable with the component 22 shown in FIGS. 3–6. The structural sizes of the accumulators of FIGS. 8–11 are associated with a housing length of 200 mm, 240 mm, 275 mm, and 350 mm.

As represented by dotted lines especially in FIGS. 2, 4 and 5, the component 22 has one or more degassing elements 44, fastened in particular to the transverse struts 40 or longitudinal struts 42. These degassing elements may be embodied as a woven fabric structure, porous material, or as a semipermeable membrane or the like. What is essential is that the degassing element 44 allows an escape of gas from the accumulator 14 but prevents the escape of liquid. Because the degassing element 44 is secured to a transverse strut 40 or a longitudinal strut 42, the degassing element 44, given suitable positioning of the accumulators 14, automatically places itself in front of the filler openings 46. Advantageously, the component 22 furthermore has a degassing labyrinth, which serves to return condensate. The possibility furthermore exists of mounting sensors, such as temperature sensors or the like, on or in the component 22 in order to monitor the charging process of the accumulators 14.

As can be seen particularly from FIGS. 5 and 12, the pole contacts 24, 26 are fastened vertically displaceably to the component 22, and as a result certain variations in the vertical positioning of the pole contacts 24, 26 and poles 16, 18 can be compensated for. In the embodiment of FIG. 5, the pole contacts 24, 26 are subjected to the prestressing of a spring 48, which seeks to displace the pole contacts 24, 26 in the direction of the associated poles 16, 18.

In the exemplary embodiment of FIG. 12, the pole contacts 24, 26 are embodied as contact pincers 52, each with two or more pincer elements 50. The contact pincers 52 have a sleevelike shape on their lower portion that surrounds the poles 16, 18. The pincer elements 50 are guided on the component 22 or some other element, such as a flange, by means of an oblique guide 54. The oblique guide 54 has an opening chamfer 56 and a closing chamfer 58, so that the pair of contact pincers 52 is shifted to the opening or closing position by compulsory guidance as a function of the vertical positioning of the component 22. In FIG. 12a, the pair of contact pincers 52 is shown in the opening position of the pincer elements 50; the pincer elements 50 are shifted automatically when the component 22 has not been placed on the group 12 of accumulators 14. This is dictated by the opening chamfer 56, which for instance by the action of gravity automatically shifts the pincer elements 50 into the opening position when the component 22 has been raised. Conversely, if the component 22 is mounted or placed on the group 12 of accumulators 14, the free ends of the pincer elements 50 come into contact with the upper housing wall 20 of the accumulators 14 and are raised or pressed upward relative to the component 22, or to the structural part that has the oblique guide 54. By means of the closing chamfer 58, the pincer elements 50 are then moved radially inward toward one another, so that they firmly enclose the pole 16, 18 of the accumulator 14, and perfect electrical contact is assured. The profiling of the pair of contact pincers 52 or pincer elements 50 is selected such that both the positive pole and the negative pole of the accumulator 14 are securely surrounded, and a good electrical contact is made. The group 12 of accumulators 14, as shown for instance in FIGS. 1 and 2, is positioned on a supporting element 60, such as a pallet, built-up pallet, conveyor belt, or the like. This supporting element 60 can have positioning aids for the groups 12 of accumulators 14, and the positioning aids optionally vary with the structural size of the accumulators, as can be seen from the arrangement of the groups 12 of accumulators 14 in FIGS. 8–11.

While in FIG. 1 the component 22 can be placed on the group 12 of accumulators 14 from above in a simple way, for instance by means of a robot, in the exemplary embodiment of FIG. 2 the component 22 is pivotably connected to the supporting element 60, for instance via a hinge 66. The exemplary embodiment of FIG. 2 certainly has the advantage that the positioning of the component 22 on the group 12 of accumulators 14 is very highly replicable.

In each case, whether it is the exemplary embodiment of FIG. 1 or that of FIG. 2, the component 22 placed on the group 12 of accumulators 14 can be connected to the supporting element 60 via retaining elements, locking elements 62 or the like, so that an independently manipulatable package is formed, comprising the supporting element 60, the group 12 of accumulators 14, and the component 22.

In FIG. 7, the supporting element 60 has vertical frame parts 64 for stacking a plurality of supporting elements 60. In particular, the component 22 is pivotably connected to the frame part 64 or locked or braced to it or separably connected to it in some similar way.

The advantage of the various embodiments of the device of the invention is, among others, that manual cabling of the individual accumulators 14 for the forming is dispensed with. In this respect, simple or automatic connection of the accumulators 14 of the group 12 to the charging device is possible. An individually attachable covering for the filler openings 46 of the accumulators 14 can also be omitted, since the component 22 has integrated degassing elements 44. The accumulators can be transported to the charging station or charging device in relatively large groups, since one supporting element, the group 12 of accumulators, and the component 22 form an independently manipulatable package. Manual uncabling after the formation of the accumulators 14 has been performed is also dispensed with. The charging or forming of the accumulators 14 is done in an extremely nonpolluting way, since the condensate from the degassing elements 44 or the degassing labyrinth is returned, and at most only slight quantities of gas emerge through the degassing element 44 during the formation. As a result, the only replenishment with acid needed after the formation of the accumulators 14 is slight. The device is extremely flexible and can be retrofitted in all conventional formation systems, such as in accumulators on pallets for stacking on shelves, on built-up pallets that can be stacked on another, on conveyor belts especially in the water tank, or on water carriers for stacking on shelves.

List of Reference Numerals
   10 Device
   12 Group
   14 Accumulator
   16 Pole
   18 Pole
   20 Upper housing wall
   22 Belt element
   24 Pole contact
   26 Pole contact
   28 Conductor element
   30 Conductor element
   32 Electrical supply connection
   34 Positive terminal
   36 Negative terminal
   38 Frame
   40 Transverse strut
   42 Longitudinal strut
   44 Degassing element
   46 Filler opening
   48 Spring
   50 Pincer element
   52 Pair of contact pincers
   54 Oblique guide
   56 Opening chamfer
   58 Closing chamfer
   60 Supporting element
   62 Locking element
   64 Frame part
   66 Hinge

What is claimed is:

1. A device (10) for forming a plurality of accumulators (14) that are combined to form a group (12) and are positioned on a supporting element (60), in particular accumulators for motor vehicles, whose poles (16, 18) are disposed on an upper housing wall (20), characterized by a flat component (22), embodied as a plate, frame, grid, or strip, on which a plurality of pole contacts (24, 26) corresponding with the poles (16) of the accumulators (14) are arranged, wherein the pole contacts (24, 26) are connected to a central electrical supply connection (32) of the component (22) via electrical conductor elements (28, 30) that are fastened to the component (22), and for forming the accumulators (14), the component (22) can be placed or mounted along with the pole contacts (24, 26) on the poles (16, 18) of the group (12) of accumulators (14), in order to establish a conductive connection between pole contacts (24, 26) and poles (16, 18).

2. The device of claim 1, characterized in that the component (22) comprises a frame (38) with transverse struts (40) and/or longitudinal struts (42) disposed on it.

3. The device of claim 1, characterized in that the pole contacts (24, 26) are positioned in rows and columns on the order of a matrix on the component (22).

4. The device of claim 3, characterized in that the spacing of the rows and/or columns have values such that the pole contacts (24, 26) can be put into electrical contact with the poles (16, 18) of accumulator groups of different structural size, optionally with modification of the grouping of the accumulators (14).

5. The device of claim 1, characterized in that the component (22) has one or more degassing elements (44), in particular fastened to the transverse struts (40) or longitudinal struts (42), and in particular has a woven fabric structure or a semipermeable membrane, which are associated with the filler openings (46) of the accumulators (14).

6. The device of claim 1, characterized in that the component (22) has a degassing labyrinth for returning the condensate.

7. The device of claim 1, characterized in that sensors, such as temperature sensors, for monitoring the charging process of the accumulators (14) are disposed on or in the component (22).

8. The device of claim 1, characterized in that the pole contact (24, 26) is fastened vertically displaceably on the component (22).

9. The device of claim 8, characterized in that the pole contact (24, 26) is subjected to the prestressing of a spring (48).

10. The device of claim 1, characterized in that the pole contact (24, 26) is embodied as a pair of contact pincers (52) that has two or more pincer elements (50).

11. The device of claim 10, characterized in that the pincer elements (50) are guided on the component (22) by means of an oblique guide (54).

12. The device of claim 11, characterized in that the oblique guide (54) has an opening chamfer (56) and/or a closing chamfer (58), so that the pair of the contact pincers (52) is shifted to the opening or closing position by compulsory guidance as a function of the positioning, in particular the vertical positioning, of the component (22).

13. The device of claim 1 in combination with a supporting element (60), such as a pallet, built-up pallet or conveyor belt, on which the group (12) of accumulators (14) can be positioned.

14. The device of claim 13, characterized in that the supporting element (60) has positioning aids for the group (12) of accumulators (14), and the positioning aids optionally vary depending on the structural size of the accumulators.

15. The device of claim 13, characterized in that the component (22) is pivotably connected to the supporting element (60), for instance via a hinge (26).

16. The device of claim 13, characterized in that the component (22) placed on the group (12) of accumulators (14) can be connected to the supporting element (60) via, locking elements (62).

17. The device of claim 13, characterized in that the supporting element (60.) has vertical frame parts (64) for stacking a plurality of supporting elements (60), and the component (22) is preferably pivotably connected to the frame part (64) or locked to it, braced on it, or in some similar way separably fastened to it.

18. The device of one of the foregoing claims, characterized in that the supply connection (32) has a positive terminal (34) and a negative terminal (36).

* * * * *

UNITED STATES PATENT AND TRADEMARK OFFICE
CERTIFICATE OF CORRECTION

PATENT NO. : 6,373,220 B1
DATED : April 16, 2002
INVENTOR(S) : Walter Wipperfurth et al.

It is certified that error appears in the above-identified patent and that said Letters Patent is hereby corrected as shown below:

Column 8,
Line 31, change "one of the foregoing claims" to -- claim 1 --.

Signed and Sealed this

Eighth Day of April, 2003

JAMES E. ROGAN
*Director of the United States Patent and Trademark Office*